(12) United States Patent
Briggs et al.

(10) Patent No.: US 11,636,353 B2
(45) Date of Patent: Apr. 25, 2023

(54) COGNITIVE SYSTEM FOR LOCALIZED LIDAR POLLUTION DETECTION USING AUTONOMOUS VEHICLES

(71) Applicant: International Business Machines Corporation, Armonk, NY (US)

(72) Inventors: Benjamin D. Briggs, Waterford, NY (US); Lawrence A. Clevenger, Saratoga Springs, NY (US); Leigh Anne H. Clevenger, Rhinebeck, NY (US); Michael Rizzolo, Albany, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1224 days.

(21) Appl. No.: 16/165,747

(22) Filed: Oct. 19, 2018

(65) Prior Publication Data

US 2020/0125969 A1 Apr. 23, 2020

(51) Int. Cl.
*G06N 5/04* (2023.01)
*G01S 17/95* (2006.01)
*G01S 17/89* (2020.01)
*H04W 4/38* (2018.01)
*G01W 1/06* (2006.01)
(Continued)

(52) U.S. Cl.
CPC .......... *G06N 5/04* (2013.01); *G01S 17/89* (2013.01); *G01S 17/95* (2013.01); *G01W 1/06* (2013.01); *G08G 1/0137* (2013.01); *H04W 4/38* (2018.02); *G01W 2001/006* (2013.01)

(58) Field of Classification Search
None
See application file for complete search history.

(56) References Cited

U.S. PATENT DOCUMENTS 6,593,582 B2 7/2003 Lee et al.
8,818,609 B1 8/2014 Boyko et al.
(Continued)

FOREIGN PATENT DOCUMENTS

CN 102628947 B 4/2014
KR 20150035204 A 4/2015

OTHER PUBLICATIONS wikipedia.org, "Surveying," Retrieved: Dec. 19, 2018, 15 pages.
(Continued)

*Primary Examiner* — Adam D Tissot
*Assistant Examiner* — Garrett F Evans
(74) *Attorney, Agent, or Firm* — Amin, Turocy & Watson, LLP (57) ABSTRACT

The present invention provides for a cognitive system using an autonomous vehicle includes a plurality of sensors configured to obtain the weather forecast for a pollution detectable area; a cognitive input to determine the pollution detectable area having highest sensitivity of pollution; a light detecting and ranging system configured to spatially probe pollution levels distributed in the pollution detectable area; an evaluation system to evaluate the probed pollution levels in the pollution detectable area; and a recommendation system for recommending an action to be taken based on evaluation system results of the probed pollution levels in the pollution detectable area, wherein the pollution levels are detected based light emitted by the light detecting and ranging system.

20 Claims, 4 Drawing Sheets

(51) Int. Cl.
   G08G 1/01        (2006.01)
   G01W 1/00        (2006.01)

(56) References Cited

U.S. PATENT DOCUMENTS

| | | | |
|---|---|---|---|
| 2015/0090291 A1 | 4/2015 | Na et al. | |
| 2016/0069743 A1* | 3/2016 | McQuilkin | A22B 5/007 |
| | | | 356/416 |
| 2017/0076509 A1* | 3/2017 | Scofield | G06F 16/29 |
| 2017/0091350 A1* | 3/2017 | Bauer | G06F 30/15 |
| 2018/0032075 A1* | 2/2018 | Valois | G01S 17/02 |
| 2018/0326811 A1* | 11/2018 | Chelian | B60H 1/00771 |
| 2019/0195990 A1* | 6/2019 | Shand | G01S 7/4861 |
| 2020/0033476 A1* | 1/2020 | Abari | G01C 21/30 |

OTHER PUBLICATIONS wikipedia.org, "Laser," Retrieved: Dec. 19, 2018, 27 pages.
wikipedia.org, "Lidar," Retrieved: Dec. 19, 2018, 28 pages.
gtri.gatech.edu, "Georgia Tech Develops Safety App for Social Workers," Retrieved: Dec. 19, 2018, 3 pages.
lidar-uk.com, "The uses of LiDAR," Retrieved: Dec. 19, 2018, 11 pages.
Sivaraman, et al., "Haze Watch: A Participatory Sensor System for Monitoring Air Pollution in Sydney," Eight IEEE Workshop on Practical Issues in Building Sensor Network Applications 2013, 9 pages.
Boubrima, et al., "Cost-Precision Tradeoffs in 3D Air Pollution Mapping using WSN," UNET 2016—2nd International Symposium on Ubiquitous Networking, May 2016, Casablanca, Morocco, 13 pages.
wikipedia.org, "Atmospheric dispersion modeling," Retrieved: Dec. 19, 2018, 11 pages.
Liu, et al., "Mobility Improves Coverage of Sensor Networks," MobiHoc'05, May 25-27, 2005, 9 pages.
Liu, et al., "Dynamic Coverage of Mobile Sensor Networks," arXiv:1101.0376v1 [cs.NI] Jan. 1, 2011, 19 pages.
Ammari "The Art of Wireless Sensor Networks," 2014, 692 pages.
Kethireddy, et al., "Geospatial Interpolation and Mapping of Tropospheric Ozone Pollution Using Geostatistics," Int. J. Environ. Res. Public Health 2014, 11, pp. 983-1000.
Batterman, et al., "High Resolution Spatial and Temporal Mapping of Traffic-Related Air Pollutants," Int. J. Environ. Res. Public Health 2015,12, pp. 3646-3666.
engadget.com, "Pigeons track air pollution in London with tiny backpacks," Retrieved: Dec. 19, 2018, 1 page.
Craft, "Microsensors help map crowdsourced pollution data," Retrieved: Dec. 19, 2018, 3 pages.
Beelen, et al., "Mapping of background air pollution at a fine spatial scale across the European Union," Sci Total Environ. Mar. 1, 2009;407(6): pp. 1852-1867.
Fredriksson, et al., "Lidar system applied in atmospheric pollution monitoring," Applied Optics / vol. 18, No. 17 / Sep. 1, 1979, 6 pages.
Moreno, et al., "Lidar probes air pollution," 2008 SPIE, 2 pages.

* cited by examiner

COGNITIVE SYSTEM FOR LOCALIZED LIDAR POLLUTION DETECTION USING AUTONOMOUS VEHICLES

FIELD OF THE INVENTION

The present invention relates to a light detecting and ranging system (LIDAR) pollution detection. More particularly, the present invention relates to a cognitive system for localized LIDAR pollution detection using autonomous vehicles.

BACKGROUND

Pollution is a significant problem in many major cities including those in China, India, and the United States. High pollution level triggers health warnings, restrictions on transportation in dense cities, and industry regulations. However, mapping high pollution levels with dedicated sensors in high fidelity is cost prohibitive.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, cognitive systems and methods for localized LIDAR pollution detection using autonomous vehicles are described.

According to an embodiment, a cognitive system using an autonomous vehicle is provided. The cognitive system includes a plurality of sensors configured to obtain the weather forecast for a pollution detectable area; a cognitive input to determine the pollution detectable area having a parameter with the highest concentration of pollution and/or sensitivity to pollution; a light detecting and ranging system configured to spatially probe pollution levels distributed in the pollution detectable area; an evaluation system to evaluate the probed pollution levels in the pollution detectable area; and a recommendation system for recommending an action to be taken based on evaluation system results of the probed pollution levels in the pollution detectable area, wherein the pollution levels are detected based on light emitted by the light detecting and ranging system.

According to another embodiment, a cognitive method using an autonomous vehicle is provided. The cognitive method includes receiving a weather forecast for indication of a pollution detectable area from a plurality of sensors; activating a light detecting and ranging system on the autonomous vehicle to spatially probe pollution levels distributed in the pollution detectable area; determining the pollution detectable area having a parameter with the highest concentration of pollution and/or sensitivity to pollution based on a cognitive input; evaluating the probed pollution levels in the pollution detectable area; and recommending an appropriate corrective action to be taken based on the evaluation results of the probed pollution levels in the pollution detectable area.

BRIEF DESCRIPTION OF THE DRAWINGS

Embodiments will be described in more detail in conjunction with the accompanying drawings, in which.

DETAILED DESCRIPTION OF THE PREFERRED EMBODIMENTS

It is understood in advance that, although this detailed description includes a description of a cognitive system for localized LIDAR pollution detection using autonomous vehicles, implementation of the teachings recited herein are not necessarily limited to a particular type of process or device structure. Rather embodiments of the present invention are capable of being implemented in conjunction with any other type of process or device structure, now known or later developed.

Various embodiments of the present invention are described herein with reference to the related drawings in the figures. The figures are intended for illustrative purposes and, as such, are not necessarily drawn to scale. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the described embodiments of the present invention are not intended to be limiting in this respect. Accordingly, a coupling of entities can refer to either a direct or an indirect coupling, and a positional relationship between entities can be a direct or indirect positional relationship.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. For the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 1:
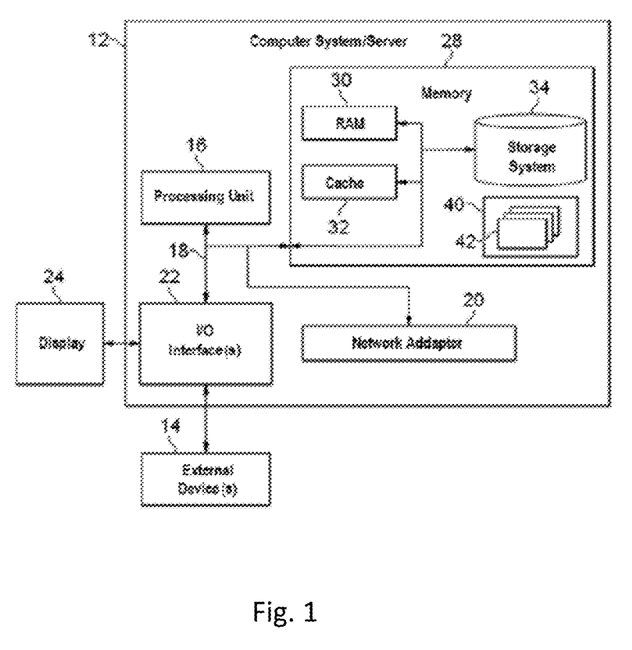
FIG. 1 schematically depicts an exemplary computer system/server which is applicable to implement the embodiments of the present invention.

Referring now to FIG. 1, a schematic of an example of a cloud computing node is shown. Cloud computing node 10 is an example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and allocated cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, at least one processor or processing units 16, a system memory 28, and a bus 18 that couples various system components including system memory 28 to processor 16.

Bus 18 represents at least one of any several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/Utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
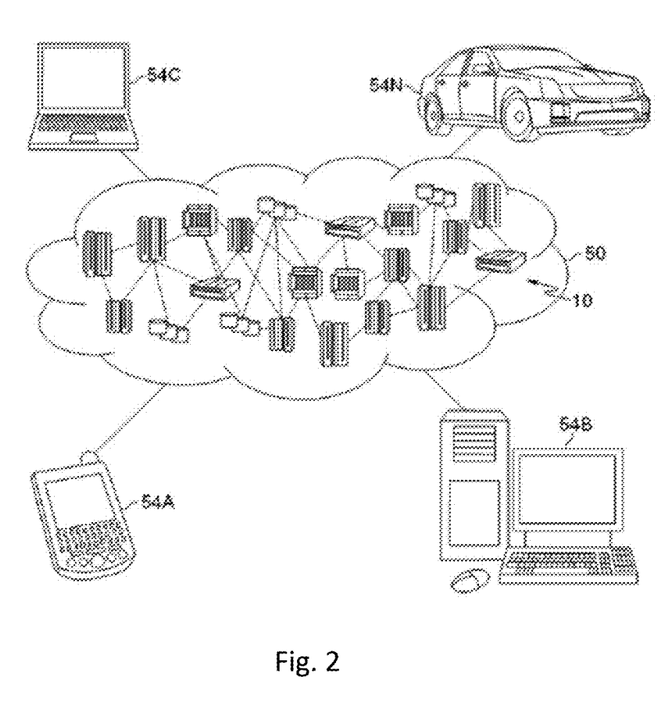
FIG. 2 schematically depicts an exemplary cloud computing environment.

Referring now to FIG. 2, an illustrative cloud computing environment 50 is depicted. As shown, the cloud computing environment 50 includes one or more cloud computing nodes 10 with which local computing devices used by cloud consumers can communicate. The local computing devices can be, for example, personal digital assistant (PDA) or cellular telephone 54A, desktop computer 54B, laptop computer 54C, and/or automobile computer system 54N. The cloud computing nodes 10 can communicate with one another. The cloud computing nodes 10 can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Embodiments of the invention provide a novel cognitive system for localized LIDAR pollution detection using autonomous vehicles and a method therefore. A cognitive system which uses semi-autonomous and fully autonomous vehicles can detect local levels of ozone concentration to combat the significant pollution problem facing many major cities. At a considerably lower cost than having dedicated high fidelity sensors, the cognitive solution can determine with high fidelity, pollution danger zones using existing light detection and ranging (LIDAR) technology. Furthermore, the cognitive system can then make recommendations to improve health outcomes.

LIDAR is a surveying method that measures distance to a target by illuminating the target with a laser light. LIDAR is laser radar which is used for semi-autonomous and fully autonomous vehicles and for lane change tracking. LIDAR uses varying wavelengths from about 10 micrometers to about 250 nanometers. Pollution detection can be done from about 200 nanometers to 360 nanometers and ranges there between. As an example, LIDAR technology can allow for the detection of ozone because ozone detects one color of light emitted by the LIDAR system, but not another.

Figure 3:
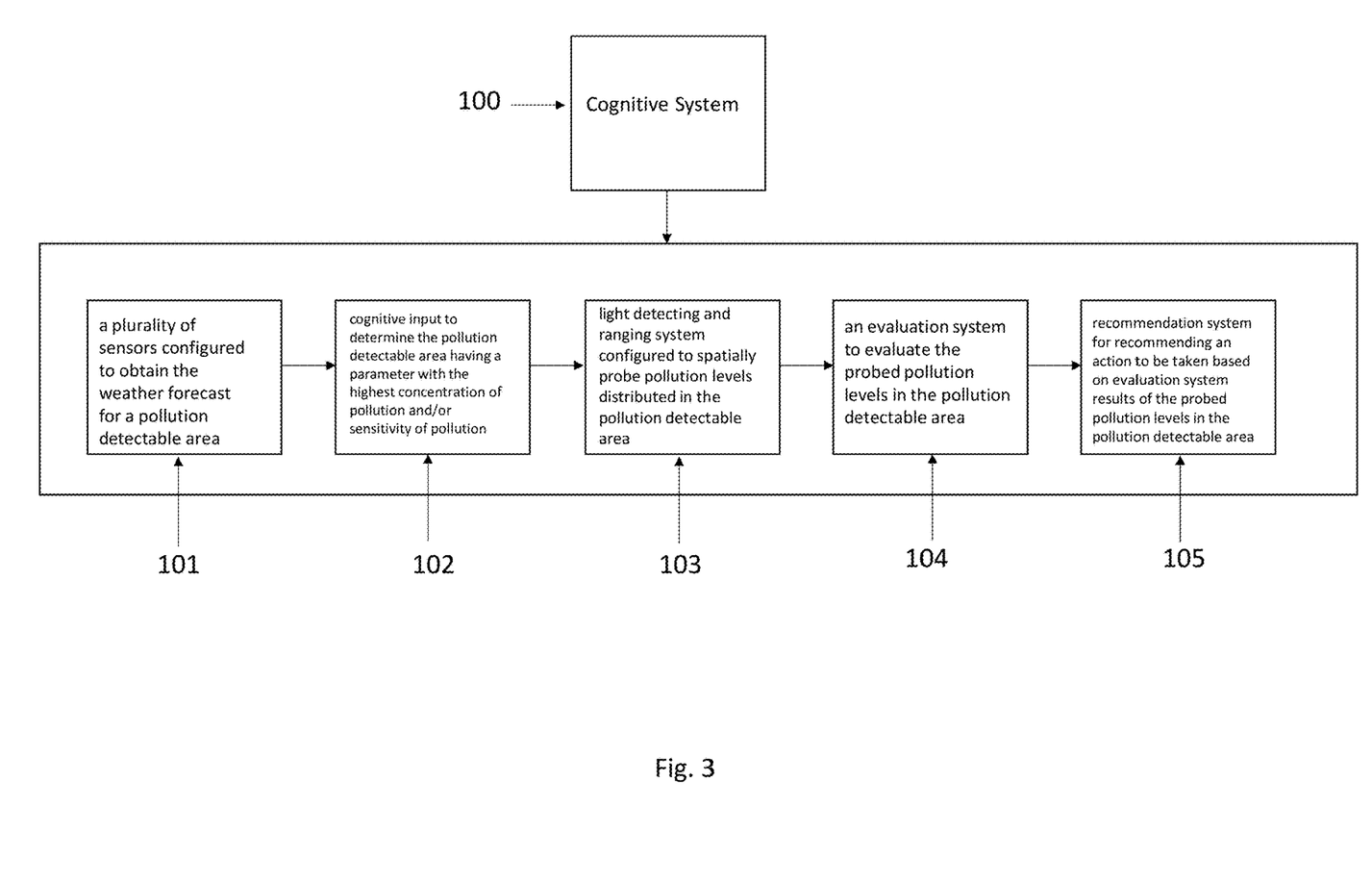
FIG. 3 depicts a flow chart of a cognitive system for localized LIDAR pollution detection using autonomous vehicles.

In FIG. 3, the cognitive system 100 includes a plurality of sensors configured to obtain the weather forecast for a pollution detectable area 101. Next, an algorithm can obtain a cognitive input and determine the pollution detectable area of the highest sensitivity of pollution 102. An application program can activate a light detecting and ranging system on the autonomous vehicle to spatially probe the pollution levels distributed in the pollution detectable area 103. The autonomous vehicle with motion-enabled LIDAR can probe an entire hemispherical volume of atmosphere in a pollution detectable area 103. The LIDAR can rotate and change angle as needed. Next, an evaluation system is provided to evaluate the probed pollution levels in the pollution detectable area 104. Then, a recommendation system, recommends an action to be taken based on the evaluation system results of the probed pollution levels in the pollution detectable area 105, wherein the pollution levels are detected based on light emitted by the light detecting and ranging system. The action taken can address the pollution levels themselves or can address the behavior of individuals nearby to prevent adverse health reactions as an example. The application program stored in memory 28 from Program/Utility 40, can run on a computer system/server 12.

The cloud computing environment 50 includes one or more cloud computing nodes 10 with which the automobile computer system 54N inside the autonomous vehicle is used to communicate with the evaluation system 104 and recommendation system 105. The automobile computer system 54N obtains various points of information from the sensors on the vehicle to understand the rules of the road. The automobile computer system 54N can manipulate the vehicles steering and braking. The sensors can include signals from the global positioning system, radar sensors, ultrasonic sensors, light detection and ranging (LIDAR), and video cameras on the autonomous vehicle.

Signals from the global positioning system satellites are combined with readings from the autonomous vehicles tachometers, altimeters, and gyroscopes are used to provide accurate positioning. The radar sensors that can be placed in the front, rear, and sides of the vehicle are used to monitor the position of other vehicles nearby. The radar sensors can be used in conjunction with technologies such as adaptive cruise-control systems. The ultrasonic sensors can be used to measure the position of objects close to the vehicle such as curbs and other vehicles, objects, and people when the autonomous vehicle is parking. The LIDAR sensors bounce pulses of the light off the surroundings. Then analysis is performed to identify lane markings and the edge of roads. The video camera sensors used on the autonomous vehicle detect traffic lights, read road signs, keep track of the position of other vehicles, and look out for pedestrians and other objects on the road.

The cognitive system 100 can have cognitive inputs 102 that include daily and real-time wind patterns, forecast, cloud coverage, asphalt coverage, greenery coverage, traffic flow, and the location of LIDAR-containing vehicles. Other cognitive inputs 102 can include at-risk population density such as for hospitals, schools, child centers, and senior centers. Additionally, cognitive inputs 102 can include governmental mandates such as traffic restrictions in a major city. For example, China and France recently implemented traffic restrictions due to pollution reasons in major cities. These implemented traffic restrictions can be taken into consideration by the cognitive system.

The light detecting and ranging (LIDAR) system 103 can aim at asphalt surface to determine dissipation rates or pollution levels or risk levels for humans, aim at human height to determine dissipation rates, and also aim higher than human height to determine dissipation rates. Furthermore, the LIDAR system can detect wavelength atmospheric conditions ranging from about 250 nanometers to 10 micrometers and ranges there between. The cognitive system 100 using an autonomous vehicle can detect pollution levels from about 200 nanometers to 360 nanometers and ranges there between. The LIDAR system 103 can detect a high-risk ozone area and allows for three-dimensional mapping of the pollution detectable area to provide high precision monitoring of the pollution detectable area. High precision monitoring allows for millimeter precision.

The evaluation system used to evaluate the probed pollution levels in the pollution detectable area 104 can include analytics for businesses and governments. These can include real estate valuation projections, health care projections, regulatory forecasting, tax planning, and logistics planning for traffic restrictions.

The recommendation system that recommends an action to be taken based on the evaluation system results of the probed pollution levels in the pollution detectable area 105 can make both short terms and long term recommendations. The short term recommendations can include traffic pattern adjustments such as restricting certain vehicle usage for a designated area. The short term recommendations can also work with government mandates for restricting certain vehicle usage for a designated area. Additional short term recommendations can include limiting public events, localized health warnings, and increased staffing for nearby hospitals, schools, child centers, and senior centers.

Long term recommendations can include urban design alterations, recommendations on coverage for greenery and asphalt, permanent traffic patterns, zoning changes, and public transit planning.

Figure 4:
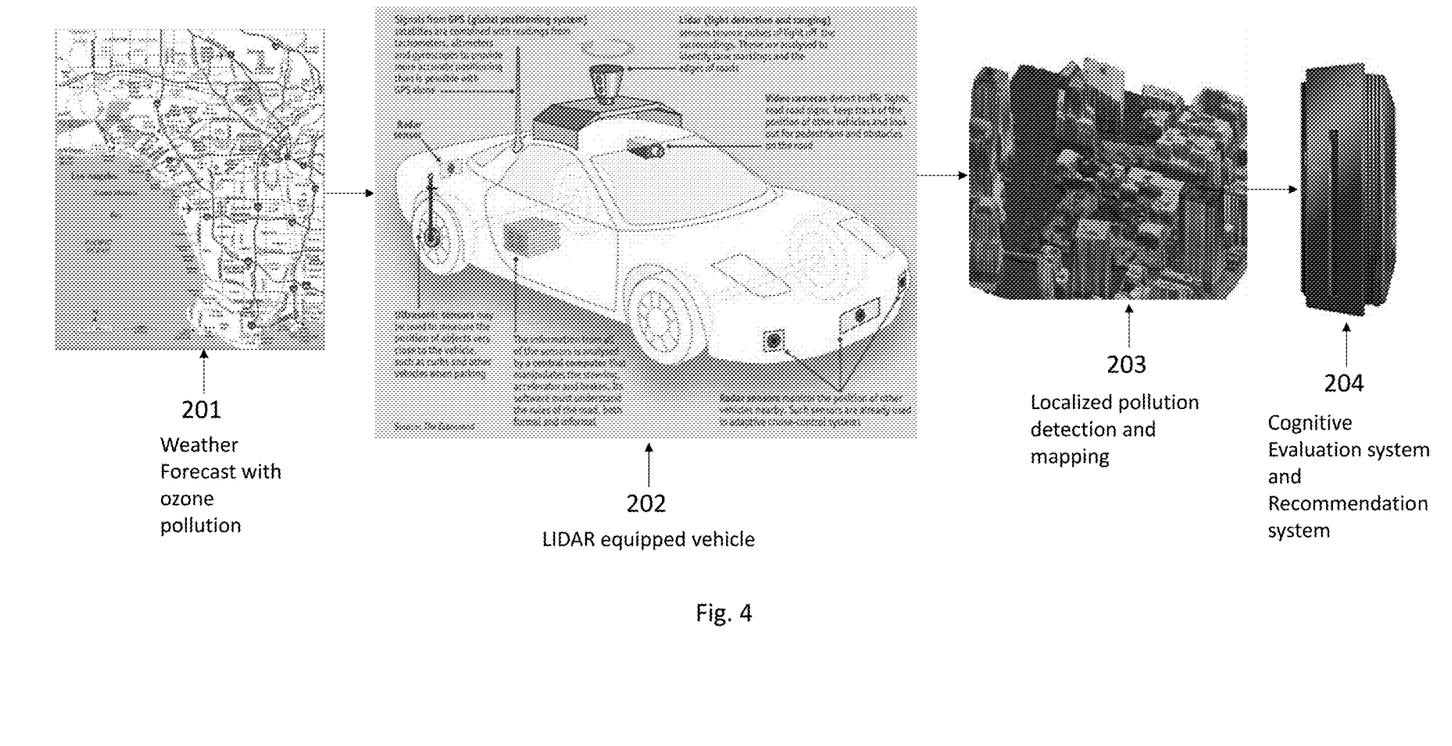
FIG. 4 depicts a visual representation of a cognitive system for localized LIDAR pollution detection using autonomous vehicles.

In FIG. 4, the cognitive method for determining pollution using an autonomous vehicle includes receiving a weather forecast for indication of a pollution detectable area from a plurality of sensors 201. Then running an application program that activates a light detecting and ranging system on the autonomous vehicle to spatially probe the pollution levels distributed in the pollution detectable area 202 is performed. Next, determining the pollution detectable pollution area having a parameter with the highest concentration of pollution and/or sensitivity to pollution based on an algorithm and a cognitive input 203 is performed. Next, there is an evaluation of the probed pollution levels in the pollution detectable area. Then, a recommendation action can be taken based on the evaluation results of the probed pollution levels in the pollution detectable area 204.

The light detecting and ranging system can scan local pollution areas 202 and can locate and measure solid objects based on a return pulse, which would measure a large peak. Additionally, the light detecting and ranging system can scan local pollution areas 202. This scan can link to nearby objects based on proximity, which would measure a small peak. An example of such an object would be a car tailpipe for a small peak. Automated identification can be done for nearby objects using the light detecting and ranging system 202 based on size, shape, writing, decals, and other distinguishing features.

Although illustrative embodiments of the present invention have been described herein, it is to be understood that the invention is not limited to those precise embodiments, and that various other changes and modifications may be made by one skilled in the art without departing from the scope of the invention.

The corresponding structures, materials, acts, and equivalents of all means or step plus function elements in the claims below are intended to include any structure, material, or act for performing the function in combination with other claimed elements as specifically claimed. The described embodiments of the present invention have been presented for purposes of illustration and description, but is not intended to be exhaustive or limited to the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The flowchart and block diagrams in the figures illustrate the functionality and operation of possible implementations of systems and methods according to various embodiments of the present invention. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. The actions can be performed in a differing order or actions can be added, deleted or modified. Also, the term "coupled" describes having a signal path between two elements and does not imply a direct connection between the elements with no intervening elements/connections therebetween. All of these variations are considered a part of the invention.

The terms "about," "substantially" and equivalents thereof are intended to include the degree of error associated with measurement of the particular quantity based upon the equipment available at the time of filing the application. For example, "about," "substantially" and equivalents thereof can include a range of ±8% or 5%, or 2% of a given value.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present invention has been described in detail in connection with only a limited number of embodiments, it should be readily understood that the present invention is not limited to such disclosed embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description, but is only limited by the scope of the appended claims.

What is claimed is:

1. A cloud system, comprising:
    a memory that stores computer executable components;
    a processor, operably coupled to the memory, and that executes the computer executable components stored in the memory, wherein the computer executable components comprise:
        a cognitive component configured to:
            obtain real-time weather data from a plurality of sensors in a defined geographic region;
            obtain a cognitive input defining at least one characteristic of the defined geographic region;
            based on the real-time weather data and the cognitive input, determine a pollution detectable area within the defined geographic region meeting a defined criterion associated with pollution risk;
            identifying a vehicle comprising a light detecting and ranging device operating in the pollution detectable area;
            remotely activate the light detecting and ranging device of the vehicle to detect one or more pollution levels at one or more locations in the pollution detectable area;
            receive, from the vehicle, pollution information comprising the one or more pollution levels at the at one or more locations;
        an evaluation component configured to evaluate the pollution information; and
        a recommendation component configured to recommend an action to be taken based on a result of the evaluation of the pollution information.

2. The cloud system of claim 1, wherein the action comprises increasing staffing at a health facility in the pollution detectable area.

3. The cloud system of claim 1, wherein the cognitive input comprises daily and real-time wind patterns.

4. The cloud system of claim 1, wherein the cognitive input comprises cloud coverage.

5. The cloud system of claim 1, wherein the cognitive input comprises traffic flow.

6. The cloud system of claim 1, wherein the cognitive input comprises at-risk population density.

7. The cloud system of claim 1, wherein the action comprises a traffic pattern adjustment.

8. The cloud system of claim 1, wherein the cognitive component is further configured to remotely control the light detecting and ranging device to aim at an asphalt surface in the pollution detectable area to determine a dissipation rate of a pollutant.

9. The cloud system of claim 1, wherein the cognitive component is further configured to remotely control the light detecting and ranging device to aim at a human height to determine a dissipation rate of a pollutant.

10. The cloud system of claim 1, wherein the cognitive component is further configured to remotely control the light detecting and ranging device to aim at a higher than human height to determine a dissipation rate of a pollutant.

11. The cloud system of claim 1, wherein the light detecting and ranging device detects wavelength atmospheric conditions ranging from about 250 nanometers to 10 micrometers and ranges there between.

12. The cloud system of claim 1, wherein the one or more pollution levels are detected from about 200 nanometers to 360 nanometers and ranges there between.

13. The cloud system of claim 1, wherein the evaluation component is further configured to detect a high-risk ozone area based on the pollution information.

14. The cloud system of claim 1, wherein the evaluation component is further configured to generate a three-dimensional map of the pollution detectable area that identifies the one or more pollution levels at the one or more locations.

15. A method, comprising:
    obtaining, by cloud system comprising a processor, real-time weather data from a plurality of sensors in a defined geographic region;
    obtaining, by the cloud system, a cognitive input defining at least one characteristic of the defined geographic region;
    based on the real-time weather data and the cognitive input, determining, by the cloud system, a pollution detectable area within the defined geographic region meeting a defined criterion associated with pollution risk;
    identifying, by the cloud system, an autonomous vehicle comprising a light detecting and ranging device operating in the pollution detectable area;
    remotely activating, by the cloud system, the light detecting and ranging device of the autonomous vehicle to detect one or more pollution levels at one or more locations in the pollution detectable area;
    receiving, by the cloud system, from the vehicle, pollution information comprising the one or more pollution levels at the at one or more locations;
    evaluating, by the cloud system, the pollution information; and
    recommending, by the cloud system, an action to be taken based on a result of the pollution information.

16. The method of claim 15, wherein the action comprises increasing staffing at a senior center in the pollution detectable area.

17. The method of claim 15, generating, by the cloud system, a three-dimensional map of the pollution detectable area that identifies the one or more pollution levels at the one or more locations.

18. The method of claim 15, wherein the cognitive input comprises at least one of daily and real-time wind patterns, cloud coverage, traffic flow, or at-risk population density.

19. The method of claim 15, wherein the action comprises restricting usage of defined type of the vehicle in the pollution detectable area.

20. The method of claim 15, wherein the action comprises a zoning change in the pollution detectable area.

\* \* \* \* \*